United States Patent Office 3,290,362
Patented Dec. 6, 1966

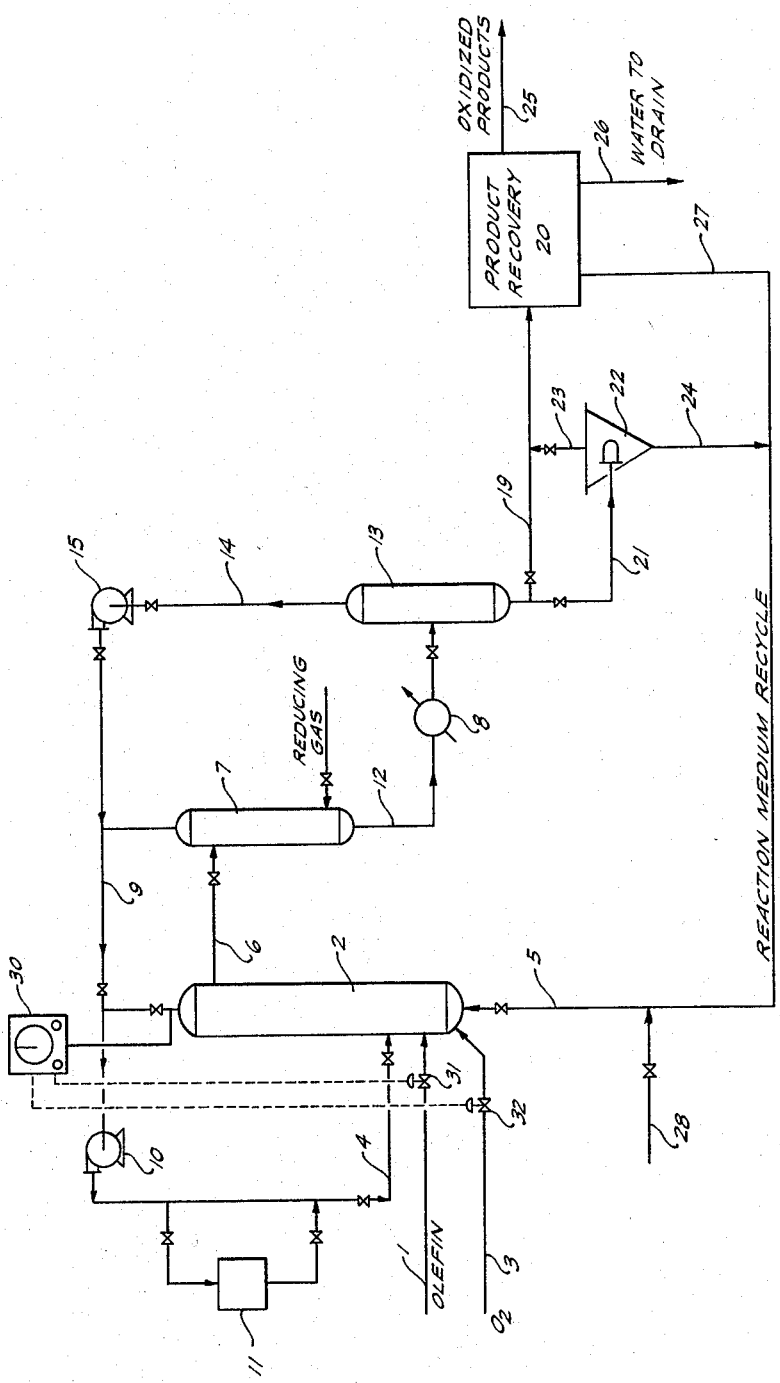

3,290,362
PROCESS FOR PREPARING ESTERS AND ACETALS BY THE OXIDATION OF OLEFINS
William D. Schaeffer, Pomona, Calif., assignor to Union Oil Company of California, Los Angeles, Calif., a corporation of California
Filed Aug. 5, 1963, Ser. No. 299,936
6 Claims. (Cl. 260—497)

This invention relates to the oxidation of olefins to carbonyl compounds by the use of organic solutions containing catalytic amounts of a platinum group metal and, in particular, relates to a method for preventing the formation of tenacious precipitates of the platinum group metal upon the vessel walls and equipment used in the process.

In a particular embodiment, this invention relates to the oxidation of ethylene to vinyl acetate and acetaldehyde in the presence of an acetic acid solution containing a platinum group metal, particularly solutions containing palladium.

In a second embodiment, the invention relates to the oxidation of ethylene to acetals and acetaldehyde by contacting the ethylene with an alcoholic solution containing catalytic amounts of a platinum group metal, particularly palladium, in the presence of oxygen.

Other embodiments of the invention will be apparent from the following description.

In the aforementioned oxidation of olefinic compounds by contacting the olefin with oxygen and an organic solution containing catalytic amounts of a platinum group metal, the reaction involves the simultaneous reduction of the dissolved metal ions to the free metal and the reoxidation of the metal to dissolved ions. Additionally, various redox salts can be employed, such as copper and iron halides, and when these redox metals are present, they also fluctuate between their high and low oxidation state during the reaction. Consequently, the solution withdrawn as a crude product from the reactor contains a substantial proportion of its platinum group metal as suspended particles of the free metal together with some insoluble salts of the low oxidation state of the redox metal.

Although the difficulties in handling this crude product containing suspended solids can be circumvented somewhat by filtering the liquid to remove the suspended solids, subsequent precipitation of the platinum group metal as the free metal generally occurs when the crude product is distilled for recovery of the oxidation products.

The precipitation of the platinum group metal from the solution is particularly irksome as the precipitate forms a tenacious deposit or film on the surfaces of customary materials of construction including glass and ceramics. Titanium linings are generally employed in the reactor to obtain the necessary corrosion resistance, and use of titanium has reduced the problem of precipitates somewhat as the platinum group metals precipitate as a crust on titanium surfaces that can be removed with sufficient agitation, e.g., stirring. The crust deposits, however, can cause difficulties by clogging transfer lines, heat exchange surfaces, etc. The problem cannot be eliminated by filtering the crude oxidation product since considerable amounts of the platinum group metal are dissolved in the product, or, if present as the free metal, are so finely divided as to pass through most filters. Upon subsequent distillation, the dissolved or suspended platinum group metal precipitates as the free metal.

It is an object of this invention to provide an efficient method for the oxidation of olefins to valuable oxidized products.

It is also an object of this invention to prevent the precipitation of adherent deposits of platinum group metal catalysts, particularly palladium, on the surfaces of equipment employed in said oxidation.

It is a further object of this invention to provide an efficient distillation method for the recovery of the oxidized products from the crude oxidate.

Other and related objects of this invention will be apparent from the following description of the invention:

I have now found that the platinum group metal in the effluent that cannot readily be removed by filtration can be prevented from forming a tenacious deposit of metal in the subsequent distillation and handling equipment by treating the effluent prior to distillation with a reducing gas, e.g., carbon monoxide, or a suitable olefin, preferably olefins having from 2 to about 5 carbons such as ethylene, propylene, butene, pentene. To avoid complex separation steps, I prefer to use the same olefin for the reduction step as used for feed to the reaction zone.

The resultant precipitate of platinum group metal can be retained as a slurry in the crude product during the subsequent distillation or, if desired, the crude product can be passed to suitable filtration equipment for the separation of the catalyst metal precipitate therefrom. The separated precipitate can then be returned to the reaction zone by addition to the reaction zone of the recycled reaction medium from the product recovery steps.

If desired, complete reduction of the reactor effluent can be accomplished in the reactor by limiting the oxygen content of the reactor exit gases to less than about 2 volume percent, preferably less than about 1 volume percent and, most preferably, less than about 0.5 volume percent. The control of the exit gases oxygen content can be effected in any suitable manner, e.g., the gases vented from the reactor (or associated effluent flash zone) and then passed through an oxygen analyzer and their oxygen content recorded and used to control the oxygen or olefin feed rates to decrease the relative rate of oxygen supply to the reactor when oxygen in the vent gases exceeds the aforementioned limits. If desired, other control such as increased reactor pressure or temperature or changes in the catalyst components in the reaction medium could also be used to increase the oxygen utilization in the reactor and thereby decrease its concentration in the effluent gases; however, alteration of these variables is less preferred as it alters the yields of the various products from the oxidation. Examples of such catalyst changes would be the addition of a nitrogen oxide and/or heavy metal compound, in particular, the combined use of both a nitrogen oxide and a copper salt as hereafter described. Increase in halide concentration also increases the oxygen conversion; however, increased halide concentration reduces the yield of vinyl acetate and increases the yield of acetic acid from that normally obtained.

The reactor effluent can be removed from the reactor, cooled and depressured to remove dissolved and entrained ethylene that is recycled to the reaction zone. If desired, a suitable removal of fixed gases and carbon oxides can be employed to prevent the accumulation of these materials in the gas stream.

The depressured reactor effluent can be directly distilled when the aforementioned control of oxygen in the vent gases is used. However, difficulty can be experienced in maintaining the close control of the process needed to prevent subsequent deposition of the platinum group metal, either because of the limitation this control can impose on the reaction rate or because upsets in control can occur and it is therefore preferred that the reactor effluent be treated or stripped with the aforementioned reducing agents in a separate reduction chamber to reduce the inseparable platinum group metal content to a metal precipitate. It is of course apparent that the guard chamber could also be used independently of the aforementioned oxygen control in the reactor gases. When ethylene is used as a reducing medium, the vapor product from the reduction step in the guard chamber can be compressed and returned to the oxidation reactor. When other gases, e.g., carbon monoxide, are employed it is preferred to exhaust the gas stream or use the gas stream for fuel purposes in the plant.

As previously mentioned, the catalyst solution contains catalytic amounts of a palladium group metal and a halogen, i.e., a bromine or chlorine containing compound. The platinum group metal can be of the palladium sub-group or the platinum sub-group, i.e., palladium, rhodium, ruthenium or platinum, osmium, or iridium. While all of these metals are active for the reaction, I prefer palladium because of its much greater activity. The platinum group metal can be employed in amounts between about 0.001 and about 5 weight percent of the liquid reaction medium, however, the reaction rate decreases at concentrations of platinum group metal less than about 0.04 weight percent and amounts of the metal in excess of about 2.0 weight percent do not appreciably increase the rate of oxidation. Accordingly, the preferred limit of the metal is between about 0.04 and about 2.0 weight percent of the catalyst solution. The platinum group metal can be added to the reaction medium as finely-divided metal, as a soluble salt or as a chelate. Examples of suitable salts are the halides and acetates such as palladium chloride, rhodium acetate, ruthenium bromide, osmium oxide, iridium chloride and palladium chloride. Examples of suitable chelates are palladium acetyl-acetonate and complexes of noble metal ions with such conventional chelating agents as tetraacetic acid, citric acid, etc.

The other necessary component of my catalyst solution is a halogen, i.e., bromine or chlorine containing compound. The halogen can be added as elemental chlorine or bromine; however, it is preferred to employ less volatile halogen compounds such as hydrogen chloride, hydrogen bromide; alkali metal halides, e.g., sodium chloride, lithium bromide, cesium chloride, potassium bromide, sodium bromate, lithium chlorate; ammonium halides, ammonium bromide, ammonium chloride, or any of the aforementioned platinum metal bromides or chlorides. Various organic compounds which liberate hydrogen halide or halogen under the reaction conditions can be used, such as aliphatic chlorides or bromides, e.g., ethyl bromide, propyl chloride, butyl chloride, benzyl bromide, phosgene, etc. In general, sufficient of the aforementioned halogen containing compounds should be added to provide between about 0.05 and about 5.0 weight percent free or coordinately bonded or covalently bonded halogen in the reaction zone; preferably concentrations between about 0.1 and about 3.0 are employed. While chlorine containing compounds are generally preferred bromine compounds can be preferred for certain reactions, e.g., in substantially anhydrous acetic acid, bromine compounds tend to favor oxidation of ethylene to vinyl acetate whereas chlorine compounds tend to favor the oxidation of ethylene to acetaldehyde and, ultimately, to acetic acid.

As previously mentioned, the reaction medium preferably comprises a substantially anhydrous organic solvent. In general, the water content of the reaction medium should be less than about 20 weight percent, preferably less than about 10 percent and, most preferably, less than about 3 weight percent. During the oxidation of the olefin, water is formed and accumulates in the reaction medium. Accordingly, it is preferred to recycle the reaction medium as a substantially anhydrous liquid and to employ relatively high liquid space rates to prevent the accumulation of amounts of water in excess of those previously stated. In general, the presence of the water in the reaction medium favors the oxidation of the olefin to aldehydes or ketones whereas the oxidation in anhydrous or substantially anhydrous organic media favors more valuable oxidized products such as unsaturated esters and acetals.

For the oxidation of olefins to acetals, the organic solvent employed is an aliphatic alcohol that is a liquid under the reaction conditions. Aliphatic alcohols having from 1 to about 20 carbon atoms can be employed such as methanol, ethanol, isopropanol, propanol, butanol, isobutanol, pentanol, isopentanol, hexanol, isohexanol, heptanol, isoheptanol, cyclohexanol, octanol, isooctanol, decanol, isodecanol, tridecanol, isododecanol, pentadecanol, isohexadecanol, octadecanol, tricosanol, isotetracosanol, pentacosanol, etc. Preferably, primary or secondary low molecular weight alcohols having from 1 to about 5 carbons are employed as solvents including methanol, ethanol, propanol, isopropanol, butanol, isobutanol, pentanol, isopentanol, etc.

For the preparation of unsaturated esters of carboxylic acids, the reaction medium should comprise a carboxylic acid such as acetic, propionic, butyric, valeric, isovaleric, caprylic, isocaprylic, succinic, glutaric, adipic, pimelic, etc. Preferably, the carboxylic acid employed is the acid of the desired acyloxy radical desired in the unsaturated ester, e.g., acetic acid is used in the preparation of vinyl acetate, propionic acid is employed in the preparation of vinyl propionates, etc.

Various other inert organic solvents can be employed in addition to the reactive alcohol or carboxylic acid aforementioned. Examples of various organic liquids that can also be present in amounts between about 0 and about 90 percent of the reaction medium employed for the synthesis of acetals or the unsaturated esters include formamide, dimethyl formamide, chlorobenzene, dichlorobenzene, aliphatic hydrocarbons such as hexane, decane, dodecane, etc.; toluene, xylene, pseudocumene, etc.

In the oxidation of olefins to unsaturated esters, the yields of ester product can be greatly increased by the addition of various carboxylate salts to the reaction medium. Generally, any soluble carboxylate salt can be added such as alkali metal carboxylates, alkaline earth carboxylates, any of the aforementioned Group VIII noble metal carboxylates or a carboxylate salt of the optional redox metals hereinafter described. The alkali metal carboxylates are preferred for their greater solubility in the organic reaction medium and of these, lithium carboxylates are most preferred. Generally, between about 0.1 and about 10 weight percent of a soluble carboxylate salt is added, preferably between about 0.5 and about 5.0 weight percent is employed. The particular alkali metal chosen has some effect on the distribution of products in the unsaturated ester production, particularly the vinyl acetate synthesis. To illustrate, the use of sodium and potassium acetates generally favor acetaldehyde and vinyl acetate production and the lithium salts favor acetic acid production. Lithium salts, however, are preferred in this oxidation because of their greater solubility and hence, the greater acetate ion concentration that can be achieved with the use of lithium.

It is of course apparent that the carboxylate salts can be formed in situ by the addition of the hydroxides of most of the aforementioned metals, particularly the alkali metal hydroxides or halides.

As previously mentioned, various redox compounds can, optionally, be used in the reaction medium. In general, any multivalent metal salt having an oxidation potential higher, i.e., more positive, than the platinum metal in the solution can be used. Typical of such are the soluble salts of multi-valent metal ions such as the acetates, bromides or chlorides of copper, iron, manganese, cobalt, mercury, nickel, cerium, uranium, bismuth, tantalum, chromium, molybdenum or vanadium. Of these, cupric and ferric salts are preferred and cupric salts are most preferred, particularly in the substantially anhydrous medium where the cupric salts appreciably increase the rate of oxidation. In general, cupric acetate, chloride or bromide is added to the reaction medium to provide a concentration of copper therein between about 0.1 and about 5 weight percent; preferably between about 0.5 and about 3.0 weight percent.

Various other oxidizing agents can also be employed to accelerate the rate of reaction. Included in such agents are the nitrogen oxides that function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate co-redox agents is most preferred for the low temperature operations where the reaction rate would otherwise be prohibitively slow. The use of the nitrogen oxide as redox agents does not appreciably alter the yields of the major products, i.e., acetals, vinyl acetate, acetaldehyde and/or acetic acid, however, it is apparent to those skilled in the art that the nitrogen oxides should be used with caution in the alcoholic reaction medium used in acetal synthesis.

In general, the oxidation of olefins to unsaturated esters, e.g., ethylene to vinyl acetate, is performed by introducing oxygen or an oxygen containing gas and the olefin into contact with the catalyst at temperatures between about 30° and about 300° C.; 90° to about 180° C. are preferred, and, to obtain optimum yields of unsaturated esters, temperatures between about 120° and about 160° C. are most preferred. In general, the oxidation of ethylene to high yields of acetic acid is favored at higher temperatures and therefore, when operating so as to generate sufficient acetic acid in situ to equal that consumed in the formation of vinyl acetate, the higher temperatures are preferred in this synthesis, from about 130° to about 180° C.

The oxidation of olefins to acetals, particularly the oxidation of ethylene to 1,1-diethoxyethane is conducted at temperatures between about 30° and about 200° C.; between about 80° and about 150° C. are preferred.

The reaction pressures employed in either oxidation are sufficient to maintain liquid phase conditions and from about atmospheric to about 100 atmospheres or more, preferably elevated pressures from about 10 to about 75 atmospheres are employed and most preferably, pressures from about 40 to about 75 atmospheres are used to obtain a high reaction rate. In general, high ethylene partial pressures result in maximum rates of oxidation. Additionally, the use of high ethylene partial pressures in the synthesis of vinyl acetate results in maximum acetaldehyde and vinyl acetate synthesis.

Under the aforedescribed conditions, the olefin is rapidly oxidized to the desired compounds. In general, the liquid catalyst solution is supplied and recycled to the reaction zone at maximum rates to prevent the accumulation of substantial amounts of water that will otherwise reduce the rate of oxidation.

The figure illustrates a process employing my invention. As illustrated, an olefin such as ethylene, propylene, butene-1 or pentene-1, preferably ethylene, is introduced through line 1 to reactor 2. Oxygen or a suitable oxygen containing gas such as air or mixtures of oxygen with air and a suitable inert gas, e.g., nitrogen, carbon dioxide, etc., is introduced through line 3 as the source of oxidant. The reactor 2 can be a suitable stirred liquid phase reactor or, if desired, can be packed with a suitable inert medium such as silica gel, diatomaceous earth, titania, Carborundum, carbon, etc. Recycle ethylene is returned to the reactor through gas recycle line 4 and the catalyst solution is introduced to the reactor through liquid recycle line 5. The crude oxidation product is removed through line 6 and passed to guard chamber 7 where it is contacted with any of the aforementioned reducing gases. Preferably, high pressures, e.g., 10 to about 100 atmospheres, are used in this step at temperatures between about 30° C. to about 300° C. Most preferably, the guard chamber is operated under the pressure and temperature conditions previously set forth for the reaction in reactor 2.

The gases from the reduction guard chamber are passed through line 9, combined with the reactor 2 effluent gases and the combined gas stream is repressured with compressor 10 for recycling to the reactor through conduit 4. In the preferred process, an oxygen analyzer and meter 30 can be used to measure the oxygen content of the reactor effluent gases or of the vapors within the upper portion of reactor 2. The meter can be set to automatically control this variable by controlling the setting of flow control valves 31 and/or 32 to decrease the relative rate of oxygen supply to reactor 2 when the measured oxygen content exceeds the aforementioned predetermined levels. Because some fixe dgases accumulate during the oxidation, such as carbon oxides formed in reactor 2 or in guard chamber 7 when carbon monoxide is used as the reducing gas, it is preferred to pass all or a portion of the recycle gas stream through a suitable fixed gas removal step shown at 11. Examples of suitable removal of fixed gases can be treatment of the recycle gas stream with an alkali metal hydroxide solution, ethanolamine solution or an alkali metal carbonate solution, etc.

The reduced liquid crude product is removed from guard chamber tower 7 through line 12, cooled in cooler 8 and passed to a flash zone 13 where the residual or soluble ethylene and other gases are separated through line 14, repressured by compressor 15 for recycling to reactor 2.

The crude product from the flash zone 13 comprises a slurry of precipitates comprising some finely divided platinum group metal and some of the copper redox salt as cuprous chloride—when salts of this redox metal are used. This slurry can be handled under most circumstances in the subsequent product recovery zone and, accordingly, is passed through line 19 directly to the product recovery steps in zone 20. If desired, however, all or a portion of the crude product from flash zone 13 can be passed through line 21 to a suitable solid liquid separation step, e.g., a centrifugal separator or other filtration means illustrated as 22 in the flow diagram. The clarified liquid product is then passed through line 23 to product recovery zone 20. The separated catalyst metal is recovered through line 24 for recycling to the oxidation zone.

Suitable product recovery steps can be employed in zone 20, depending on the nature of the products produced. In the synthesis of vinyl acetate by the oxidation of ethylene is an acetic acid reaction medium these steps can comprise the distillation of all components boiling below acetic acid in the first stage, with subsequent distillation steps to separate the acetaldehyde by-product and azeotropic distillation of a water-vinyl acetate azeotrope. The vinyl acetate is subsequently purified for recovery through line 25 as the major oxidized product. The acetaldehyde by-product also recovered can be marketed as such or preferably, can be oxidized to acetic acid for recycling to oxidation zone 2 as a supply of acetic acid thereto. The water formed in the reaction is removed through line 26.

When the oxidation step is the synthesis of acetals from olefins, e.g., dimethyl acetal or diethyl acetal from ethylene, product recovery zone 20 comprises a series of distillation steps using azeotropic or conventional fractionation to separate a relatively pure acetal product or a mixture of the acetal in alcohol as the product. The product can be marketed as such or preferably passed to a suitable pyrolysis step for the production of the corresponding vinyl ether.

In either method, the recycle reaction medium, i.e., carboxylic acid or alkanol is removed from the product recovery zone through line 27 and recycled to the oxidation reactor 2. Suitable make-up catalyst components can be added through line 28 to maintain the desired concentration of the catalyst components during the process.

The following examples will illustrate the results obtainable when practicing my invention:

*Example 1*

To a one-gallon autoclave was added a mixture containing 1.0 gram palladium chloride, 7.5 grams lithium chloride, 7.5 grams lithium acetate dihydrate, 7.5 grams cupric acetate monohydrate and 750 grams acetic acid. The mixture was pressured to 500 p.s.i.g. with ethylene, heated to 300° F. and nitrogen was added until 900 p.s.i.g. was reached. Then, 20 pounds of oxygen was added to initiate the reaction. The reaction was continued for 30 minutes by adding oxygen and nitrogen alternately to maintain the total pressure near 900 p.s.i.g.

After 30 minutes, the reaction mixture was cooled and vented. The vent gases contained about 2.5 percent oxygen. Approximately one-third of the reaction mixture was withdrawn as a green solution and filtered to remove a small quantity of suspended palladium powder. Analysis of the clear filtrate showed the presence of 0.045 gram of palladium per liter of filtrates. The clear filtrate was distilled at atmospheric pressure to drive off products boiling below acetic acid whereupon a precipitate of palladium metal and cuprous chloride was formed in the liquid residue. A substantial portion of the precipitated palladium deposited on the surface of the glass distillation vessel as a mirror.

The remaining two-thirds of the reaction mixture in the autoclave was pressured to 500 p.s.i.g. with ethylene and heated to 300° F. for five minutes. The mixture was then cooled, the gases vented and the product collected. The product was a pale-brown solution containing a quantity of precipitated cuprous chloride and palladium powder. The mixture was filtered to remove solids from a clear filtrate that was found to be free of any palladium. The clear filtrate was distilled at atmospheric pressure to remove products boiling below acetic acid and the distillation did not result in precipitation of palladium or cuprous chloride.

*Example 2*

The identical procedure of Example 1 was repeated; however, carbon monoxide was used in lieu of ethylene in the reduction step. At end of initial reaction, an aliquot of the reaction mixture (green in color) contained 0.022 gram palladium per liter. The mixture was distilled and the characteristic precipitate and mirror was formed during distillation.

The remainder of reaction mixture in the autoclave was pressured to 100 p.s.i.g. with carbon monoxide and heated at 300° F. for 5 minutes. The reaction product (pale-brown in color) was filtered to remove a precipitate of palladium and cuprous chloride. An analysis of the filtrate showed it to be free of palladium. The distillation of filtrate gave no precipitation or mirror, although a small quantity of cuprous chloride separated during distillation.

The preceding examples are intended solely to illustrate the practice of my invention and results thereby secured. These examples are not intended to be unduly limiting of the invention which is defined by the method steps and their obvious equivalents set forth in the following claims.

I claim:
1. In the oxidation of an olefin having from about 2 to about 5 carbons to valuable oxygenated compounds selected from the class consisting of acetals and unsaturated esters of carboxylic acids wherein oxygen and said olefin are introduced into a reaction zone to contact therein a substantially anhydrous organic reaction medium containing catalytic amounts of a platinum group metal and comprising a reactant selected from the class consisting of aliphatic carboxylic acids and monohydroxy alcohols having from 1 to about 20 carbons to prepare an unsaturated ester of said carboxylic acid when said reaction medium is selected to contain said carboxylic acid and to prepare an acetal of said alcohol when said reaction medium is selected to contain said alcohol, wherein said reaction zone is maintained at temperatures between about 50° and about 200° centigrade and sufficient pressures to maintain liquid phase conditions and wherein a catalyst containing effluent is withdrawn from said reaction zone; the improved method for preventing the formation of tenacious deposits of the platinum metal upon the surfaces of equipment and vessels contacted by said effluent that comprises separating said effluent into gas and liquid streams, analyzing the gas stream so separated for free oxygen content and controlling the relative rate of oxygen introduction into said reaction zone so as to maintain said oxygen content less than about 1.0 volume percent and thereby maintain said catalyst in said reactor effluent in a reduced state; distilling said liquid stream to recover the volatile products from a liquid residue and returning said liquid residue and said catalyst to said reaction zone.

2. The oxidation of claim 1 comprising the oxidation of ethylene to vinyl acetate wherein said olefin is ethylene and said reaction medium is acetic acid containing 0.04 to 5.0 weight percent palladum and between about 0.1 and 5.0 weight percent halide selected from the class consisting of bromine and chlorine containing compounds.

3. The oxidation of claim 1 comprising the additional steps of depressuring said reactor effluent to separate dissolved gases therefrom and thereafter contacting said depressured reactor effluent under reducing conditions with a reducing gas selected from the class consisting of carbon monoxide, hydrocarbon olefins having 2 to about 5 carbons and mixtures thereof.

4. In the oxidation of olefins having from about 2 to about 5 carbons to valuable oxygenated compounds selected from the class consisting of acetals and unsaturated esters of carboxylic acids by introducing oxygen and said olefin into a reaction zone to contact therein a substantially anhydrous organic reaction medium containing catalytic amounts of a platinum group metal and comprising a reactant selected from the class consisting of aliphatic carboxylic acids and monohydroxy alcohols having from 1 to about 20 carbons to prepare an unsaturated ester of said carboxylic acid when said reaction medium is selected to contain said carboxylic acid and an acetal of said alcohol when said reaction medium is selected to contain said alcohol; wherein said reaction zone is maintained at temperatures between about 50° and about 200° centigrade and sufficient pressures to maintain liquid phase conditions and wherein a catalyst containing effluent is withdrawn from said reaction zone, the improved method for preventing the formation of tenacious deposits of the platinum metal upon the surfaces of equipment and vessels contacted by said effluent that comprises depressuring said effluent to separate dissolved gases therefrom, contacting said depressured effluent under reducing conditions with a reducing gas selected from the class consisting of carbon monoxide, hydrocarbon olefins, having 2 to about 5 carbons and mixtures thereof and thereafter distilling said reactor effluent to recover volatile products from a liquid residue and returning said residue and said reduced catalyst to said reaction zone.

5. In the method for the oxidation of ethylene to vinyl acetate wherein oxygen and ethylene are introduced into a reaction zone to contact therein a liquid solution comprising an acetic acid solvent containing between about 0.04 and about 5.0 weight percent palladium and between about 0.1 and about 5.0 weight percent halide selected from the class consisting of bromine and chlorine containing compounds, wherein the reaction zone is maintained at a temperature between about 50° and about 200° centigrade and a pressure between about 10 and about 80 atmospheres and wherein a catalyst containing effluent is withdrawn from said reaction zone; the improved method for preventing the formation of tenacious palladium deposits on the surfaces of equipment and vessels contacted by said effluent that comprises depressuring said effluent to separate dissolved gases therefrom, contacting the depressured effluent under reducing conditions with a gas selected from the class consisting of carbon monoxide, hydrocarbon olefins having 2 to about 5 carbons and mixtures thereof, distilling the reduced effluent to recover vinyl acetate from a liquid residue containing said palladium and halide compounds and returning said residue to said reaction zone.

6. In the oxidation of an olefin having from about 2 to about 5 carbons to an acetal wherein oxygen and said olefin are introduced into a reaction zone to contact therein an alcoholic reaction medium containing between about 0.04 and about 5.0 weight percent of palladium and between about 0.1 and about 5.0 weight percent of a mineral acid, wherein the reaction zone is maintained at a temperature between about 50° and 200° C. and at a pressure between about 10 and about 80 atmospheres sufficient to maintain a liquid phase, and wherein a catalyst containing effluent is withdrawn from the reaction zone; the improved method of avoiding the formation of tenacious deposits of palladium on the surfaces of equipment and vessels contacted by said effluent that comprises depressuring said effluent, contacting the depressured effluent with a reducing gas selected from the class consisting of carbon monoxide, hydrocarbon olefins having 2 to about 5 carbon atoms and mixtures thereof, distilling the reduced effluent to recover said acetal from a liquid residue containing said palladium and mineral acid and returning said residue to said reaction zone.

References Cited by the Examiner

UNITED STATES PATENTS 3,057,915 10/1962 Rienmenschneider __ 260—597 X

FOREIGN PATENTS 137,511 4/1960 U.S.S.R.
145,469 5/1962 U.S.S.R.

OTHER REFERENCES

Smidt, Angew. Chim., vol. 71, pp. 176–182 (1959).
Moiseev, Doklady Akademii Nauk SSSR, vol. 133, pp. 377–380 (1960).
Smidt, Chemistry and Industry, Jan. 13, 1962, pp. 54–61.

LORRAINE A. WEINBERGER, *Primary Examiner.*

LEON ZITVER, *Examiner.*

D. P. CLARKE, V. GARNER, *Assistant Examiners.*